June 27, 1933.  A. E. FORSYTH  1,915,304
PNEUMATIC SUSPENSION DEVICE
Filed June 5, 1929  2 Sheets-Sheet 1
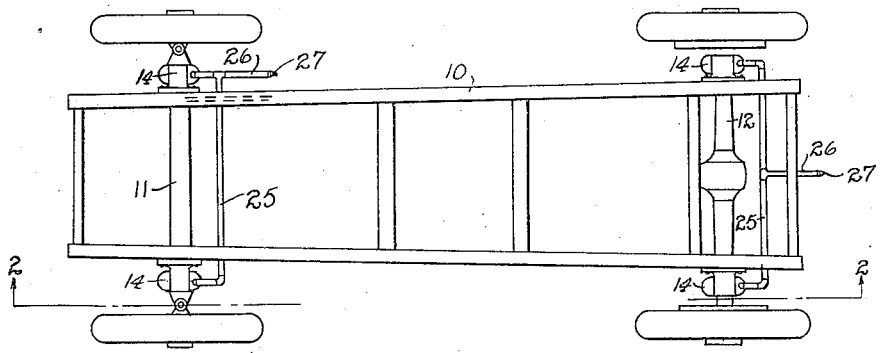
FIG_1
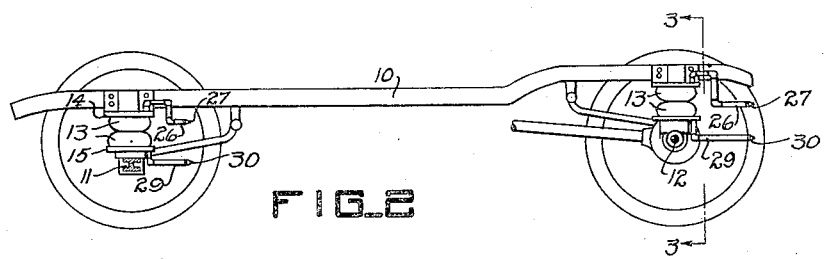
FIG_2
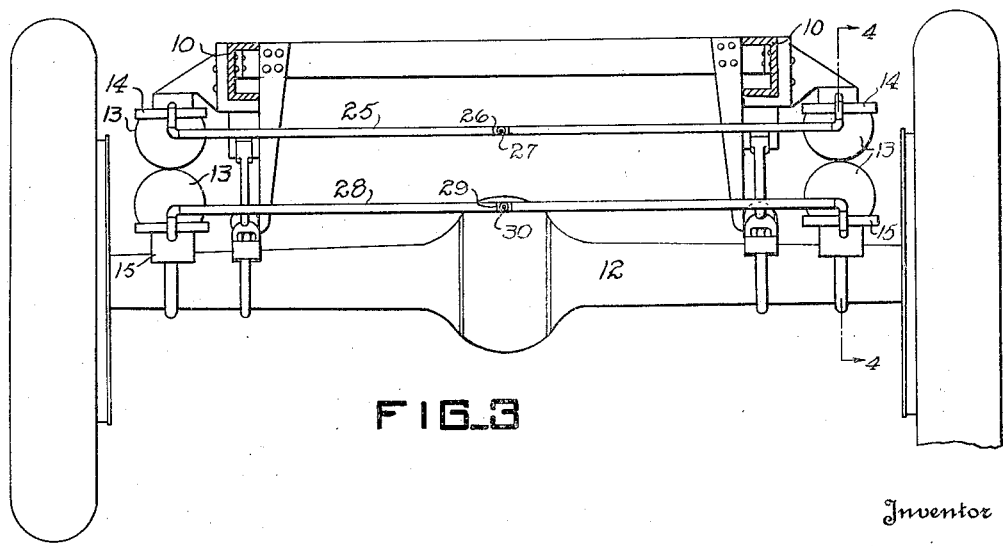
FIG_3
Inventor
Albert E. Forsyth
By Bates, Golrick & Teare
Attorneys

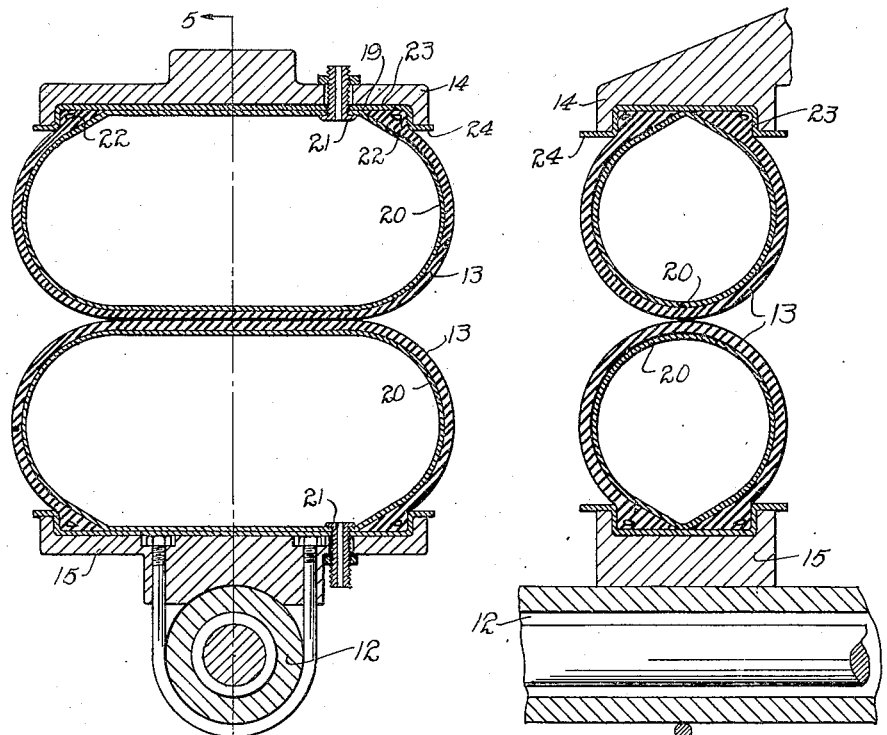
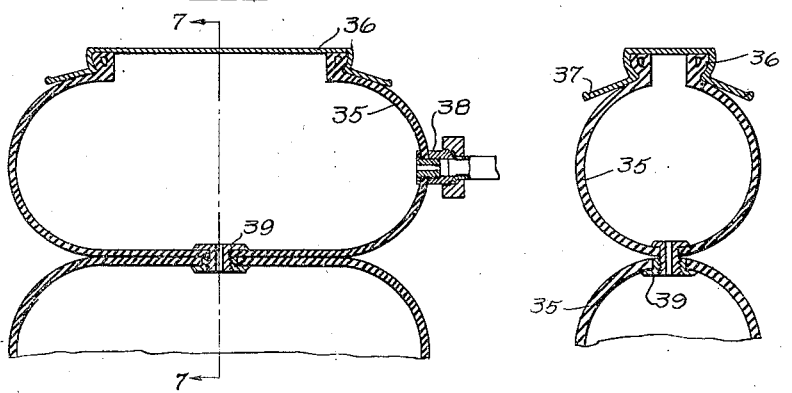

Patented June 27, 1933

1,915,304

UNITED STATES PATENT OFFICE

ALBERT E. FORSYTH, OF OTTAWA, ONTARIO, CANADA, ASSIGNOR TO FORSYTH AUTOMOTIVE PNEUMATIC SPRING, LIMITED, OF OTTAWA, ONTARIO, CANADA

PNEUMATIC SUSPENSION DEVICE

Application filed June 5, 1929. Serial No. 368,475.

This invention relates to pneumatic spring suspension devices for vehicles, and is particularly concerned with the provision of a pneumatic connection between the chassis frame and the axles, which includes inflatable containers that function to eliminate the necessity for the usual spring suspension means. In my copending application, Serial No. 328,248 filed December 24, 1928, I have shown a pneumatic spring suspension device which briefly includes a pair of superimposed inflatable containers at each suspension point between the frame and axles. The containers which I have illustrated comprise resilient members which pneumatically interconnected, and which are intended to be positioned in saddles and to absorb vertical motion of the axles with reference to the frame.

An object of the present invention is to facilitate the manufacture of the containers which I have shown in my copending application by constructing them so that tire making machinery may be readily adapted for maintaining them on a production basis. A further object is to make a container which may be readily removed and quickly repaired in the case of failure, while in use.

Referring to the drawings, Fig. 1 is a top plan view of a chassis frame with pneumatic spring connections between the frame and axle; Fig. 2 is a section taken through the vehicle on a plane indicated by the line 2—2 in Fig. 1; Fig. 3 is a vertical transverse section taken on the line 3—3 in Fig. 2; Fig. 4 is a vertical transverse section with the pneumatic cushion device on a relatively large scale; Fig. 5 is a vertical transverse section through the device shown in Fig. 4; and Figs. 6 and 7 are sections taken on planes extending longitudinally and transversely respectively, through a pneumatic device embodying a modification of my invention.

A vehicle chassis frame on which my invention is adapted for use is illustrated at 10, as having side bars and end bars connected in the usual way. The frame is shown as having a front axle 11, and a rear axle 12 associated therewith and as having groups of inflatable spring suspension elements 13 extending between it and the respective axles. In the preferred form, there are two of such elements disposed in superimposed relationship at each suspension point. A saddle 14 is shown as being carried by the frame and as providing a seat for the upper element, while a saddle 15 is being shown as mounted upon an axle, and as providing a seat for the lower element.

In Figs. 4 and 5, each pneumatic element is illustrated as having an inner tube 20 which is imbedded within a casing and as having an outlet nipple 21 which extends through a slit 19 in the casing, thence through an opening in the saddle. The nipple provides a passageway through which the tube may be inflated. The casing is also illustrated as having a bead 22 extending around the slit and as fitting snugly into a recess 23 in the associated saddle. Each saddle preferably has a laterally extending flange 24 adjacent the marginal edges thereof for providing a shelf against which the side walls of the casing may engage, while the element is being flexed during use.

The elements at the top of each group on the same axle may be pneumatically interconnected by a pipe 25. A branch pipe 26 may then extend from the pipe 25 and may be provided with an air supply valve 27. A pipe 28 makes a similar connection for the lower elements at each axle, while a branch pipe 29 having an air supply valve 30 leads therefrom to an accessible point alongside the frame.

In Figs. 6 and 7, I have shown a modification of my invention wherein the pneumatic elements comprise a casing 35 which is provided with a clincher type of bead 36 and which is intended to hold air under pressure in a satisfactory manner without the necessity of an inner tube. To this end, a saddle 36 is also shown as being of the clincher type and as having a flange 37 extending laterally therefrom and around the marginal edges thereof. A nipple 38 provides a suitable connection through which the element may be inflated, and if desired, the casings may be interconnected pneumatically by a detachable connection 39.

An important advantage of the present invention is the fact that the pneumatic elements are capable of being satisfactorily made with existing apparatus, and that they can be readily removed for replacement purposes in the event of pneumatic failure while in use.

I claim:

A vehicle pneumatic suspension device comprising in combination, a vehicle frame, an axle associated therewith, there being groups of pneumatic elements providing the sole load supporting connection between the frame and axle, each group comprising a pair of superimposed inflatable elements in contiguous relationship, each element being adapted to be inflated independently of the contiguous elements.

In testimony whereof, I hereunto affix my signature.

ALBERT E. FORSYTH.